United States Patent [19]

Kaan et al.

[11] Patent Number: 5,758,028
[45] Date of Patent: May 26, 1998

[54] FUZZY LOGIC CONTROL FOR COMPUTER IMAGE GENERATOR LOAD MANAGEMENT

[75] Inventors: Carson Kaan, Seattle; Annette Janett, Bellevue; David Bakeman, Seattle; Kent Cauble, Renton; Dale Miller, Seattle, all of Wash.

[73] Assignee: Lockheed Martin Aerospace Corporation, Bethesda, Md.

[21] Appl. No.: 522,870

[22] Filed: Sep. 1, 1995

[51] Int. Cl.⁶ ..................................................... G06F 9/44
[52] U.S. Cl. .................. 395/51; 395/3; 395/61; 395/900; 395/903
[58] Field of Search ............................ 395/51, 61, 3, 395/900, 903

[56] References Cited

U.S. PATENT DOCUMENTS

| | | | |
|---|---|---|---|
| 4,839,823 | 6/1989 | Matsumoto | 395/61 |
| 5,111,232 | 5/1992 | Tsunefuji | 395/900 |
| 5,263,123 | 11/1993 | Hayashi | 395/51 |
| 5,295,061 | 3/1994 | Katayama et al. | 395/61 |
| 5,303,331 | 4/1994 | Namba | 395/51 |
| 5,442,401 | 8/1995 | Murakami et al. | 395/900 |
| 5,495,558 | 2/1996 | Tashima | 395/51 |
| 5,544,256 | 8/1996 | Brecher et al. | 395/900 |
| 5,590,246 | 12/1996 | Asgharzadeh et al. | 395/900 |
| 5,594,835 | 1/1997 | Rahman et al. | 395/900 |
| 5,619,614 | 4/1997 | Rayne et al. | 395/900 |

OTHER PUBLICATIONS

Jou et al., "Design and Implementation of a Self–Adaptive Fuzzy Inference Engine" International Conf. on Fuzzy Systems, IEEE Jul. 1995.

Cardoso et al., "Fuzzy logic Steering Controller for Guided Vehicle", Mediterranean Electrotechnical Conference, IEEE Apr. 1994.

*Primary Examiner*—George B. Davis
*Attorney, Agent, or Firm*—Kenneth W. Float

[57] ABSTRACT

A fuzzy logic load management controller for use with a computer image generator. The load management controller is used use with a computer image generator having a plurality of inputs and a plurality of outputs, and includes an adder that couples inputs to the image generator. The load management controller comprises a fuzzy logic controller disposed in a feedback loop between the output of the image generator and the adder. The load management controller includes a fuzzy logic inference engine, a set of membership functions coupled to the inference engine, and a rules database coupled to the inference engine that includes a set of if-then rules that specify the response of the fuzzy logic controller to inputs applied thereto. The fuzzy logic controller provides for load management of the image generator that gracefully degrades a viewed scene, keeps the image update rate constant, and renders important objects in the viewed scene.

4 Claims, 1 Drawing Sheet

FUZZY LOGIC CONTROL FOR COMPUTER IMAGE GENERATOR LOAD MANAGEMENT

BACKGROUND

The present invention relates generally to computer image generators, and more particularly, to a load management system using fuzzy logic control for use with computer image generators.

Computer image generators respond to visual overload by degrading the image update rate and by randomly dropping out objects in a viewed scene. Image update rate degradation creates temporal anomalies during real-time animation of an image. Random drop-outs in the viewed scene cause objects that may be more important to be lost while less important objects are still rendered. Neither of these anomalies is acceptable. Therefore, a load management system is desired that gracefully degrades the viewed scene while keeping the image update rate constant and rendering the important objects.

Two factors that computer image generator load management schemes can use to control the amount of data in the viewed scene are viewing range and level of detail (LOD) multipliers. The viewing range controls the volume of the database that is rendered. The level of detail multipliers influence the level of detail at which terrain, terrain objects (such as houses), and dynamic objects are rendered. Higher levels of detail have more polygons or other characteristics that make them more expensive for processing. FIGS. 1a–1c show the same model at three different levels of detail. Level of detail multipliers may exist for the scene as a whole, allowing a global effect, or on types of objects, allowing finer control and prioritization of the different object types (e.g. houses degrading in image quality before cars).

Accordingly, it is an objective of the present invention to provide for a load management system using fuzzy logic control for computer image generators.

SUMMARY OF THE INVENTION

To meet the above and other objectives, the present invention is a fuzzy logic load management controller that is used with a computer image generator. The fuzzy logic load management controller provides for a load management system that gracefully degrades a viewed scene, keeps the image update rate constant, and renders important objects in the viewed scene.

The load management controller is used with a computer image generator having a plurality of inputs and a plurality of outputs. The controller comprises a fuzzy logic controller disposed in a feedback loop around the image generator. The adder is used to couple outputs of the fuzzy logic controller to inputs of the image generator. The controller comprises a fuzzy logic inference engine, a set of membership functions coupled to the inference engine, and a rules database coupled to the inference engine that includes a set of if-then rules that specify the response of the fuzzy logic controller to inputs applied thereto. Inputs to the controller are outputs of the image generator that are coupled to the inference engine. Outputs of controller are outputs of the inference engine that are combined with inputs to the image generator in the adder and applied to the image generator.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

By way of introduction, one problem relating to computer image generator load management is the design of a feedback controller that controls view range and level of detail (LOD) multipliers that affect the overall load on the image generator. The response of the load is very nonlinear and is highly dependent upon the spatial distribution of objects, the distribution of types of objects in a viewed scene, and the differences in load between one level of detail and the next for graphics objects that are displayed. The characteristics of the scene can change from one moment to the next as the view moves about a database used to create the viewed image, and as dynamic objects move within the viewed scene. Thus, characterizing the overall system is difficult, if not impossible.

A classical control system requires an accurate mathematical model of the overall system and a linear response to its control input, and it is clearly not suitable in solving the above-described load management problem. However, in recent years, fuzzy logic control has been successfully used for a variety of complex nonlinear systems ranging from elevator control to driving subway cars. The use of fuzzy logic provides the capability to encode heuristic rules that control imprecise and ambiguous systems and can solve problems that classical control systems cannot.

Figure 1A:
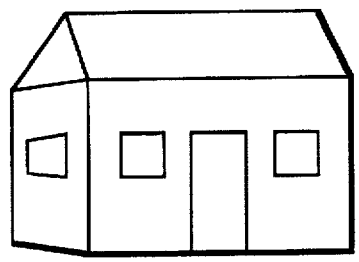
FIGS. 1a 1b and 1c show diagrams of a house represented at three different levels of detail, from most to least.
Figure 1B:
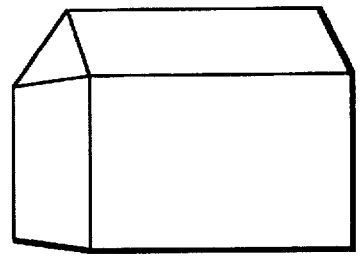
Figure 1C:
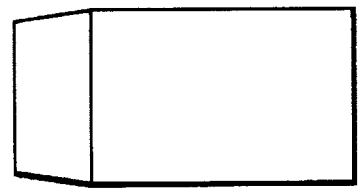
Figure 2:
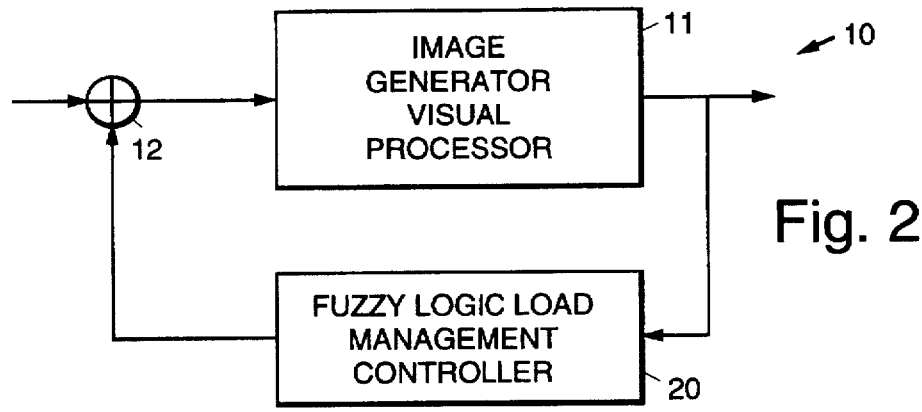
FIG. 2 is a fuzzy logic controller in accordance with the present invention that modifies the data that is input into a computer image generator visual processor, thereby controlling its loading.

Referring to the drawing figures, FIG. 2 shows a fuzzy logic load management controller 20 in accordance with the present invention that modifies the data that is input into a computer image generator visual processor 11, or image generator 11, by way of an adder 12, for example, thereby controlling the loading on the image generator 11. The fuzzy logic controller 20 is disposed in a feedback loop around the image generator 11.

Figure 3:
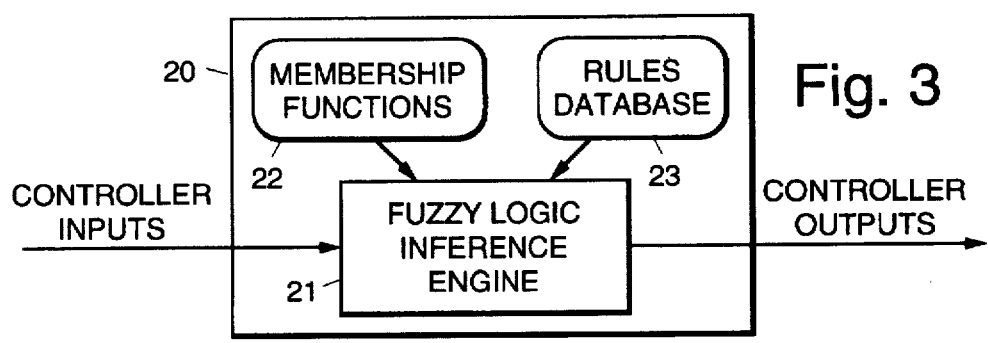
FIG. 3 shows the structure of the fuzzy logic controller of the present invention.

FIG. 3 shows the structure of the fuzzy logic controller 20 of FIG. 2. The fuzzy logic controller 20 comprises a fuzzy logic inference engine 21, a set of membership functions 22 coupled to the inference engine 21, and a rules database 23 coupled to the inference engine 21. Outputs from the image generator 11 provide inputs to the fuzzy logic controller 20 that are applied to the inference engine 21 and outputs of the controller 20 are provided by outputs of the inference engine 21 that are coupled to the adder 12.

In the fuzzy logic controller 20, priorities of views and types of objects may be specified, the response of the image generator 11 to overload, the desired loading factor and the limits to which view range and level of detail multipliers are viewed may be changed. These characteristics are not encoded into the image generator 11; but are specified in configuration files that are loaded at system initialization, or may be specified by the user during runtime to empirically adjust the system towards a desired response during prototyping. The configuration files describe the membership functions 22 and rules database 23. At initialization, the files are read and the data loaded into the fuzzy logic controller 20. During runtime, new membership functions 22 and rules databases 23 may be read from different files, and loaded into the fuzzy logic controller 20, affecting its operation. The membership functions 22 and rules databases 23 may also be changed by inputs provided by a user, allowing interactive fine-tuning of the fuzzy logic load management controller 20.

The image generator 11 is modeled with the following inputs and outputs. The inputs of the image generator 11 include: (1) View Data (field of view, viewing range, view level of detail, position, and orientation, and the like) for each view, (2) Object Data (level of detail multiplier, position, orientation, polygonal data, etc.) for each object instance, and (3) Terrain Data. The outputs of the image generator 11 include: (1) Load (percent loading) and (2) Change (delta) in Load.

The computer image generator 11 uses view data to control its processing of object data. The view data include field of view, viewing range, view position and orientation, and the like. The field of view, which includes horizontal and vertical angles, defines the "window" onto the virtual three-dimensional world that is displayed while the viewing range defines the range to which the virtual world is visible. The position and orientation define the location and the direction of the view on the virtual world (e.g., in a database 23 of Washington D.C., for example, specifying that the view is at the White House looking East rather than on Capitol Hill looking South.) The view level of detail multiplier is used in the derivation of the effective range to all database objects within the field of view; this effective range is used to determine which level of detail of the objects are to be displayed.

The object data include object level of detail, object position and orientations object polygonal data, and the like. The object level of detail is used to in the derivation of the effective range to that specific object, and affects which level of detail is displayed for that specific object. The object position and orientation are used for (1) clipping — if the object is not within the field of view, it is not displayed; (2) computing the effective range between the view and the object that is used for level of detail determinations, (3) perspective projection; (4) lighting and shading; (5) obscurance; and (6) order of processing. The polygonal data describes the appearance of the object (e.g., a house object is made of walls, roof, doors, windows, etc., that are comprised of polygons.)

The fuzzy logic controller 20 has the following inputs and outputs. The inputs of the fuzzy logic controller 20 include: (1) Image Generator Load, (2) Delta Load, (3) View Priority, (4) View Viewing Range (VR) Multiplier, (5) View LOD Multiplier, (6) Object Instance Count, (7) Object Priority, and (8) Object LOD Multiplier. The outputs of the controller 20 include: (1) View VR Multiplier, (2) View LOD Multiplier, and (3) Object LOD Multiplier. Since there can be multiple views, and a large number of Object types, the number of inputs and outputs can be very large. Given K views and L object types, the number of inputs is equal to K*3+L*3+2, and the number of outputs is equal to K*2+L.

Each input and output corresponds to a fuzzy set. For flexibility, the capability to specify and process the views and objects generally (i.e. all views and objects are processed the same) or to specify and process the views and objects individually is allowed. By specifying the views and objects generally, the number of fuzzy sets is reduced. The rules database 23 comprises a set of if-then rules that specify the response of the fuzzy logic controller 20 to inputs thereto.

One advantage of using the fuzzy logic controller 20 is that the behavior of the image generator 11 does not have to be strictly characterized, and a rough model may be used. The image generator 11 can be simply characterized: (1) the load increases as the viewing range increases; (2) the load increases fast when the viewing range increases fast; the load increases slowly when the viewing range increases slowly; (3) the load increases as the view LOD multiplier or object LOD multipliers decrease (decreasing the multipliers decreases the effective range of objects and terrain.); and (4) the load increases fast when the level of detail multipliers decrease fast; the load increases slowly when the level of detail multipliers decrease slowly.

There are many other advantages resulting from using the fuzzy logic controller 20, including the very small size of the inference engine 21 (which may be implemented using a few hundred lines of code), and placing of the "intelligence" of the controller 20 in the membership functions 22 and rules database 23, which are user-specified in an easily understood syntax. The membership functions 22 and rules database 23 that are loaded into the fuzzy logic controller 20 determine the characteristic behavior of the controller 20, including the percentage load to stabilize the image generator 11, the relative priorities of the various views (e.g. less important views may undergo more drastic visual degradation than more important ones), the relative priorities of the different types of objects, and the speed at which the view range and level of detail multipliers react to changes in load.

The processing performed by the inference engine 21 includes the following steps: fuzzication of the input using the input membership functions 22; invocation of the rules database 23 on the fuzzified input values to produce fuzzy output values; and the defuzzication of the output values to produce "sharp" outputs.

The power of using fuzzy logic is that this simple model is enough to build an effective fuzzy logic load management controller 20. Of course, tuning is required to achieve optimum results or for tailoring to specific applications. However, no complex mathematical model is necessary. An example of a fuzzy logic controller 20 in accordance with the principles of the present invention including the membership functions 22 and rules comprising the rules database 23 is presented below.

In this example, the views and objects are specified generally. A system with four views is illustrated that have the following characteristics (priorities are determined by the user):

| Item | Name | Priority |
| --- | --- | --- |
| View 0 | far left view | 250 |
| View 1 | center left view | 140 |
| View 2 | center right view | 80 |
| View 3 | far right view | 80 |

The objective of the fuzzy logic controller 20 is to maintain the load on the image generator 11 between 0.85 and 0.90 (i.e. between 85% and 90%).

The membership functions 22 for the inputs and outputs are defined below. There is one membership function 22 for each fuzzy set, and each input and output has a number of fuzzy sets. The membership functions 22 for the View LOD Multiplier, View VR Multiplier and Model LOD Multiplier inputs are not defined because they are not used in this example.

| View Priority | | | | |
|---|---|---|---|---|
| LOW | 0 | 0 | 63 | 125 |
| MEDIUM | 63 | 125 | 125 | 188 |
| HIGH | 125 | 188 | 250 | 250 |
| Load | | | | |
| LOW | 0 | 0 | 80 | 85 |
| MEDIUM | 80 | 85 | 90 | 95 |
| HIGH | 90 | 95 | 100 | 100 |
| Delta Load | | | | |
| NEGATIVE | −100 | −100 | −5 | 0 |
| ZERO | −5 | 0 | 0 | 5 |
| POSITIVE | 0 | 5 | 100 | 100 |
| View VR Multiplier (CVRS) | | | | |
| N LARGE | −30 | −20 | −10 | −5 |
| N MEDIUM | −10 | −5 | −5 | −2 |
| N SMALL | −5 | −2 | −2 | 0 |
| ZERO | −2 | 0 | 0 | 2 |
| P SMALL | 0 | 2 | 0 | 5 |
| P MEDIUM | 2 | 5 | 5 | 10 |
| P LARGE | 5 | 10 | 20 | 30 |
| View LOD Multiplier (CLS) | | | | |
| N LARGE | −30 | 1-20 | −10 | −5 |
| N MEDIUM | −10 | −5 | −5 | −2 |
| N SMALL | −5 | −2 | −2 | 0 |
| ZERO | −2 | 0 | 0 | 2 |
| P SMALL | 0 | 2 | 2 | 15 |
| P MEDIUM | 2 | 5 | 5 | 10 |
| P LARGE | 5 | 10 | 20 | 30 |

The rules database 23 is defined as follows.

Views: In this example, only three of five inputs are used for view control, and include: Load, Delta Load, and View Priority. To cover all the combinations of the three inputs, 27 rules are possible; however, only 20 are required in this example, because under certain conditions, View Priority is irrelevant. The reasoning behind the rules is that for each view, the viewing range and level of detail multipliers will be modified by a variable that is dependent upon the extent to which the image generator 11 is loaded, the change in loading, and the priority of the view. Non-active views are not processed, nor are views with priorities higher than 250.

Rule 1: if (Load is LOW) and (Delta Load is NEGATIVE) then (CVRS is POSITIVE LARGE) and (CLS is POSITIVE LARGE)

Rule 2: if (Load is LOW) and (Delta Load is NEGATIVE) and View Priority is LOW) then (CVRS is positive SMALL) and (CLS is POSITIVE SMALL)

Rule 3: if (Load is LOW) and (Delta Load u ZERO) and View Priority is LOW) then (CVRS is POSITIVE SMALL) and (CLS is POSITIVE SMALL)

Rule 4: if (Load is LOW) and (Delta Load is ZERO) and (View Priority is MEDIUM) then (CVRS is POSITIVE MEDIUM) and (CLS is POSITIVE MEDIUM)

Rule 5: if (Load is LOW) and (Delta Load is ZERO) and View Priority is HIGH) then (CVRS is POSITIVE LARGE) and (CLS is POSITIVE LARGE)

Rule 6: if (Load is LOW) and (Delta Load is POSITIVE) and (View Priority is LOW) then (CVRS is ZERO) and (CLS is ZERO)

Rule 7: if (Load is LOW) and (Delta Load is POSITIVE) and (View Priority is MEDIUM then (CVRS is POSITIVE SMALL) and (CLS is POSITIVE SMALL)

Rule 8: if (Load is LOW) and (Delta Load is POSITIVE) and (View Priority is HIGH) then (CVRS is POSITIVE MEDIUM) and (CLS is POSITIVE MEDIUM)

Rule 9: if (Load is MEDIUM) tin (CVRS is ZERO) and (CLS is ZERO)

Rule 10: if (Load is MEDIUM) and (Delta Load is NEGATIVE) and (View Priority is HIGH) then (CVRS is POSITIVE SMALL) and (CLS is POSITIVE SMALL)

Rule 11: if (Load is MEDIUM) and (Delta Load is POSITIVE) and (View Priority is LOW) then (CVRS is NEGATIVE MEDIUM) and (CLS is NEGATIVE MEDIUM)

Rule 12: if (Load is MEDIUM) and (Delta Load is POSITIVE) and (View Priority is MEDIUM) then (CVRS is NEGATIVE SMALL) and (CLS is NEGATIVE SMALL)

Rule 13: if (Load is MEDIUM) and (Delta Load is POSITIVE) and View Priority is HIGH) then (CVRS is ZERO) and (CLS is ZERO)

Rule 14: if (Load is HIGH) and (Delta Load is NEGATIVE) then (CVRS is NEGATIVE SMALL) and (CLS is NEGATIVE SMALL)

Rule 15: if (Load is HIGH) and Delta Load is NEGATIVE) and (View Priority is HIGH) then (CVRS is ZERO) and (CLS is ZERO)

Rule 16: if (Load is HIGH) and (Delta Load is ZERO) then (CVRS is NEGATIVE SMALL) and (CLS is NEGATIVE SMALL)

Rule 17: if (Load is HIGH) and (Delta Load is ZERO) and (View Priority is LOW) then (CVRS is NEGATIVE LARGE) and (CLS is NEGATIVE LARGE)

Rule 18: if (Load is HIGH) and (Delta Load is POSITIVE) and (View Priority is LOW) then (CVRS is NEGATIVE LARGE) and (CLS is NEGATIVE LARGE)

Rule 19: if (Load is HIGH) and (Delta Load is POSITIVE) and View Priority is MEDIUM) then (CVRS is NEGATIVE MEDIUM) and (CLS is NEGATIVE MEDIUM)

Rule 20: if (Load is HIGH) and (Delta Load is POSITIVE) and (View Priority is HIGH) then (CVRS is NEGATIVE SMALL) and (CLS is NEGATIVE SMALL)

Thus, fuzzy logic may be used to provide the fuzzy logic load management controller 20 for a computer image generator 11, which is a highly complex, nonlinear system that classical control systems cannot suitably control. The fuzzy logic controller 20 allows the user to specify its operating characteristics during initialization and runtime. The user may specify the membership functions 22 and rules database 23, using two methods. The first method involves editing files that are loaded into the fuzzy logic controller 20 at system initialization, or during runtime to reinitialize the fuzzy logic controller 20. The second method involves interactively entering values while the system is running to fine tune the fuzzy logic controller 20; when the optimum desired characteristics have been achieved, then the user may specify that the current membership functions 22 and rules database 23 be saved to a file. This file may then be loaded into the system during the current run, or in future runs when it can be loaded at system initialization or during runtime. This flexibility allows the fuzzy logic load management controller 20 to be optimized for different simulations and scenarios.

Thus, a load management system comprising a fuzzy logic controller for use with computer image generators has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A load management controller for use with a computer image generator that processes a plurality of object data inputs to produce a plurality of object data outputs, said load management controller comprising:

an adder having first and second inputs and an output, for receiving the plurality of object data inputs at its first input, and for supplying the plurality of object data inputs to the image generator by way of its output; and a fuzzy logic controller disposed in a feedback loop between an output of the image generator and the second input of the adder, wherein said fuzzy logic controller comprises:

a fuzzy logic inference engine;

a set of membership functions coupled to the inference engine; and a rules database coupled to the inference engine that comprises a set of if-then rules that specify a response of the fuzzy logic controller to object data inputs applied thereto;

wherein the object data inputs to the fuzzy logic controller comprise the plurality of object data outputs of the image generator that are coupled to the inference engine, and object data outputs of the fuzzy logic controller comprise object data outputs of the inference engine that are combined with the plurality of object data inputs by way of the second input of the adder and coupled to the image generator.

2. The load management controller of claim 1 wherein the membership functions and rules database that are loaded into the controller define a behavior of the controller including a percentage load to stabilize the image generator, relative priorities of various views, relative priorities of different types of objects, and a speed at which a view range and level of detail multipliers react to changes in load.

3. An image generation system comprising:

a computer image generator that processes a plurality of object data inputs to produce a plurality of object data outputs;

an adder having first and second inputs and an output, for receiving the plurality of object data inputs at its first input, and for providing the plurality of object data inputs to the image generator; and a fuzzy logic load management controller coupled between an output of the image generator and the second input of the adder, wherein said controller comprises:

a fuzzy logic inference engine;

a set of membership functions coupled to the inference engine; and a rules database coupled to the inference engine that comprises a set of if-then rules that specify a response of the controller to inputs applied thereto;

wherein the object data inputs to the controller comprise the plurality of object data outputs of the image generator that are coupled to the inference engine, and object data outputs of controller comprise object data outputs of the inference engine that are combined with the plurality of object data inputs by way of the second input of the adder and coupled to the image generator.

4. The system of claim 3 wherein the membership functions and rules database that are loaded into the controller define a behavior of the controller including a percentage load to stabilize the image generator, relative priorities of various views, relative priorities of different types of objects, and a speed at which a view range and level of detail multipliers react to changes in load.

* * * * *